April 25, 1961  M. W. MULDER ET AL  2,981,554
TOOL BOX AND STEP ASSEMBLY
Filed Sept. 2, 1960

INVENTORS
MARVIN W. MULDER,
NICKOLAS H. KLEINHUIZEN,
BY
McMorrow, Berman & Davidson
ATTORNEYS.

United States Patent Office 2,981,554
Patented Apr. 25, 1961

2,981,554
TOOL BOX AND STEP ASSEMBLY
Marvin W. Mulder and Nickolas H. Kleinhuizen, both of Clara City, Minn.
Filed Sept. 2, 1960, Ser. No. 53,669
3 Claims. (Cl. 280—164)

The present invention relates to tractors generally and in particular to a tool box and step assembly for a tractor.

Tractors of the type presently used with agriculture equipment fail to provide any step upon which an operator may stand while filling the gas tank or performing other operations on the tractor. With the increase in use of ground working tools which are mounted directly below and behind the operator's seat, access to the seat from the rear of the tractor is difficult, dangerous, and demands that the operator step upon the ground working tool attached to the tractor with resultant damage to the tool in many cases.

An object of the present invention is to provide a tool box and step assembly for a tractor which enables the operator of a tractor to mount the seat of the tractor from a position forwardly of the working rear wheels, the step providing means by which the operator may service the tractor, replenish the gasoline supply of the tractor, or perform other repair operations in safety and in comfort, the step assembly also providing means for supporting a relatively large tool box at a place of ready accessibility to the operator of the tractor.

Another object of the present invention is to provide a tool box and step assembly which is easily and with facility mounted upon any tractor frame, one which is sturdy in construction, one which is simple in structure, and one which may be manufactured in quantity at reasonable cost.

These and other objects and advantages of the present invention will be fully apparent from the following description when taken in conjunction with the annexed drawing, in which.

Figure 1:
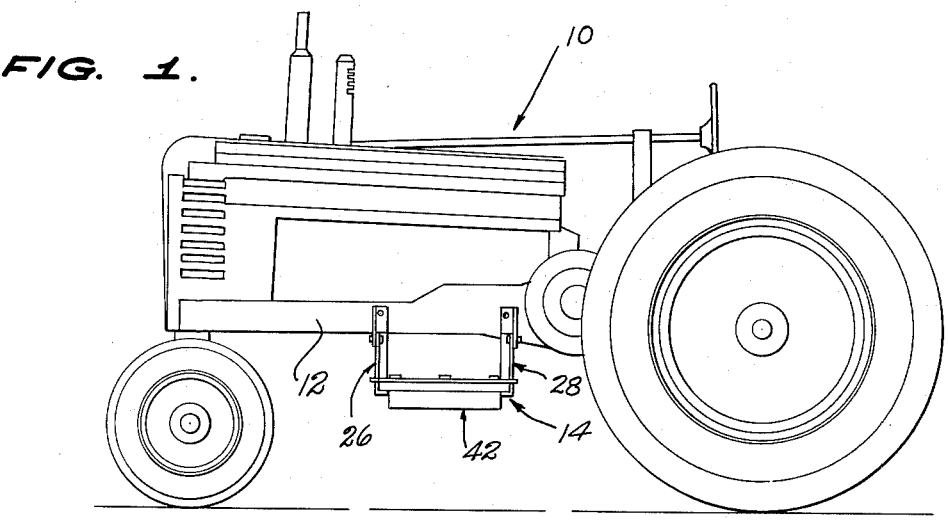
Figure 1 is a side elevational view of a tractor with the assembly of the present invention installed thereon.

With continued reference to the drawing in which like numerals indicate like parts throughout the several views, in Figure 1 the numeral 10 designates generally a tractor of the type employed to tow agricultural implements although the tool box and step assembly of the present invention is not necessarily limited to such a tractor.

The tractor 10 has a frame 12 to which the tool box and step assembly of the present invention is attached, the assembly being indicated generally by the reference numeral 14 in Figure 1.

The assembly 14 includes a horizontally disposed open frame 16 having spaced side members 18 and 20.

Figure 3:
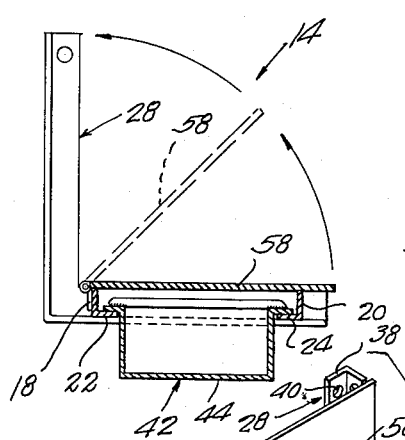
Figure 3 is a view taken on the line 3—3 of Figure 2, the dotted line showing indicating the swinging movement of the tread plate.

A ledge 22 extends along the full length of the side member 18 and another ledge 24 extends along the full length of the side member 20, the side member 18 and ledge 22 being formed integrally as an angle iron, and the side member 20 and ledge 24 being formed integrally as another angle iron, as shown most clearly in Figure 3. The ledges 22 and 24 face each other, as shown most clearly in Figure 3.

An L-shaped hanger element 26 is disposed adjacent the one ends of the side members 18 and 20 and another L-shaped hanger element 28 is disposed adjacent the other ends of the side members 18 and 20.

The hanger element 26 has a short leg 30 abutting against the one ends of the side members 18 and 20 and fixedly secured thereto by welding or other suitable means. The long leg 32 of the hanger element 26 is disposed vertically above the short leg 30 and is provided with mounting holes 34 for securing the same to the tractor frame 12.

The short leg 36 of the hanger element 28 is disposed in abutting relation with respect to the other ends of the side members 18 and 20 and is fixedly secured thereto by welding. The long leg 38 of the hanger element 28 extends vertically above the short leg 36 and is provided with other holes 40 for securing to the tractor frame 12.

Figure 4:
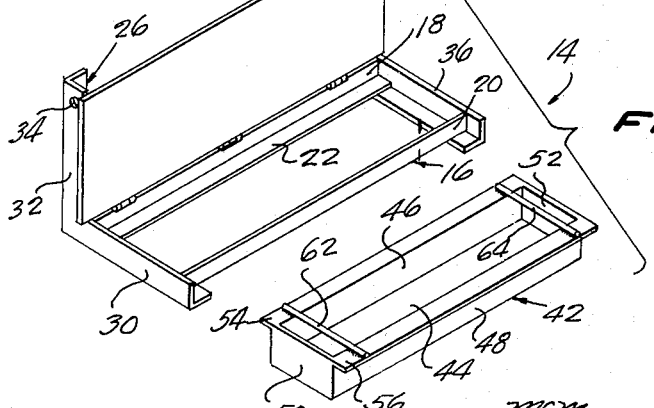
Figure 4 is an isometric exploded view of the tool box and step assembly, showing the tread plate in position permitting removal of the tool box from the step assembly.

A tool box designated generally by the reference numeral 42, in Figures 3 and 4, has a bottom 44, side walls 46 and 48 arranged in spaced relation and rising from the bottom 44, and end walls 50 and 52 connecting the adjacent ends of the side walls 46 and 48 together. A flange 54 extends outwardly from the upper end of the side wall 46 and another flange 56 extends outwardly from the upper end of the side wall 48.

The tool box 42 is insertable into and withdrawable through the open top of the frame 16 and when it is inserted into the frame 16, the flanges 54 and 56 rest upon the ledges 22 and 24, respectively.

Figure 2:
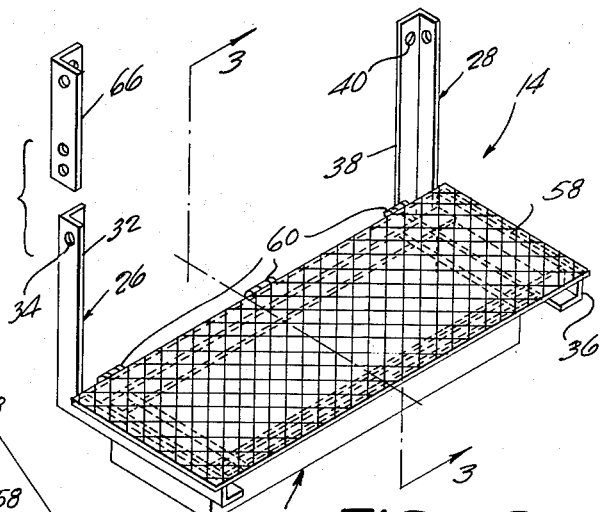
Figure 2 is an exploded isometric view of the tool box and step assembly of the present invention showing the tread plate in its position closing the upper end of the tool box.

A tread plate 58 having a non-skid upper surface, as shown in Figure 2, is positioned so as to cover the open top of the tool box 42 and has the hinge means along one side edge thereof hingedly connecting it to the side member 18 for swinging movement from the covering position shown in Figure 2 to a position out of covering relation with respect to the tool box 42, as indicated by dotted lines in Figure 3. In Figure 4, the tread plate 58 is shown in a vertical position lying against the long legs 32 and 38 of the hanger elements 26 and 28, respectively. The hinge means, embodying ordinary hinges 60, are shown most clearly in Figure 2.

The tool box is provided with handles 62 and 64 inwardly of the ends thereof, the handles being rod-like in form and having their end portions welded to the flanges 54 and 56.

In use, the long legs 32 and 38 are dependingly supported from the tractor frame 12, being either directly connected or employing extensions 66 if found necessary for the dimensions of the tractor frame 12.

Tools may be accommodated in the tool box 42 and the latter supported within the frame 16 in the place of ready accessibility to the operator of the tractor 10. The tread plate 58 forms a non-skid surface when it is in the position closing the tool box 42 and an operator of the tractor may use the tread plate 58 of the support while working on the tractor or filling the same with gas or for any other purpose desired.

What is claimed is:

1. The combination with a tractor frame, of a tool box assembly comprising an elongated frame including a pair of spaced side members, a ledge extending along the full length of each of said side members, said ledges being adjacent each other, hanger means carried by the ends of said side members for dependingly securing said frame from said tractor frame, a tool box including a bottom, spaced side walls rising from said bottom, a flange carried by the upper end of each of said side walls, said flanges facing away from each other, and an end wall connecting each of the adjacent ends of said side walls together and positioned within said frame so that each of the flanges extends along and rests upon the adjacent ledge, a tread plate covering said tool box, and means extending along one of the side edges of said tread plate connecting said tread plate to the adjacent frame side member for swinging movement of said tread plate from the covering position to a position out of covering relation with respect to said tool box.

2. The combination with a tractor frame, of a tool box assembly comprising an elongated frame including a pair of spaced side members, a ledge extending along the full length of each of said side members, said ledges being adjacent each other, an L-shaped hanger element disposed adjacent each of the ends of said side members so that the short leg thereof abuts and is secured to the adjacent ends of said side members and the long leg is vertically disposed and above said short leg, the long legs of said hanger elements being dependingly secured to the tractor frame, a tool box including a bottom, spaced side walls rising from said bottom, a flange carried by the upper end of each of said side walls, said flanges facing away from each other, and an end wall connecting each of the adjacent ends of said side walls together and positioned within said frame so that each of the flanges extends along and rests upon the adjacent ledge, and a tread plate covering said tool box and supported upon said frame side members.

3. The combination with a tractor frame, of a tool box assembly comprising an elongated frame including a pair of spaced side members, a ledge extending along the full length of each of said side members, said ledges being adjacent each other, hanger means carried by the ends of said side members for dependingly securing said frame from said tractor frame, a tool box including a bottom, spaced side walls rising from said bottom, a flange carried by the upper end of each of said side walls, said flanges facing away from each other, and an end wall connecting each of the adjacent ends of said side walls together and positioned within said frame so that each of the flanges extends along and rests upon the adjacent ledge, and a tread plate covering said tool box and supported upon said frame side members.

References Cited in the file of this patent
UNITED STATES PATENTS

| | | |
|---|---|---|
| 1,726,398 | Limbocker | Aug. 27, 1929 |
| 2,797,957 | North | July 2, 1957 |